INVENTORS
Peter A. Yurcick
C. Tyler Bills

BY Walter H. Schneider
ATTORNEY

United States Patent Office 3,698,935
Patented Oct. 17, 1972

3,698,935
REINFORCING ELEMENTS FOR RUBBER
Peter A. Yurcick, South River, and Charles Tyler Bills, Metuchen, N.J., assignors to Ashland Oil, Inc., Houston, Tex.
Original application Sept. 8, 1967, Ser. No. 666,243. Divided and this application Feb. 3, 1971, Ser. No. 112,217
Int. Cl. B32b 27/36; C09d 3/56
U.S. Cl. 117—76 T
6 Claims

ABSTRACT OF THE DISCLOSURE

Fiber reinforcement is coated with an aqueous mixture of rubber latex, two-stage liquid polyhydric phenol aldehyde aromatic amine resin and sufficient additional reactive aldehyde to render the resin thermosetting upon reaction therewith. The resin, which is prepared prior to admixture with the latex, is preferably formed by a stepwise reaction of aniline with formaldehyde, then resorcinol, and thereafter additional formaldehyde, the last-mentioned addition of formaldehyde being in the form of an alcoholic solution. The coated fiber reinforcement is dried and then, while in contact with an unvulcanized solid rubber matrix containing curatives, is subjected to sufficient heat and pressure to vulcanize and form the rubber into a reinforced article displaying improved adhesion between the rubber and reinforcement under conditions of high temperature and dynamic stress. Particularly worthwhile results have been observed in the bonding of polyester fibers to rubber, especially in pneumatic tires reinforced with polyester cords.

RELATED APPLICATION

This application is a division of our prior copending parent application, Ser. No. 666,243 filed Sept. 8, 1967, now abandoned.

BACKGROUND OF THE INVENTION

Rubber articles frequently include reinforcing material, in the form of one or more textile materials, such as fibers, cords and fabric. In order to secure a strong and lasting bond between the rubber and the reinforcement, the reinforcing material is coated with an adhesive composition. Then the adhesive-coated reinforcement is embedded in the rubber to form a tire or other rubber article, and the article is vulcanized. If the adhesive is deficient in tenacity towards the rubber and/or the reinforcement, the article is prone to fail in service, especially when subjected to heat and dynamic stresses. In a pneumatic tire, the adhesive may represent only a very minor part of the total weight of materials (e.g. one half of one percent), but its effectivness makes the difference between the success and failure of the tire. The adhesives employed to anchor the cords in tires are called upon to perform an exceedingly difficult task—making textile fibers of high tensile strength and low elongation cooperate with rubber of low tensile strength and high elongation in a type of service characterized by elevated temperatures (e.g. above 140° F.) and severe dynamic stresses.

At a very early stage in the tire building art, when cotton fiber tire cords were the predominant reinforcing material, it was suggested that an adhesive based upon a resorcinol/formaldehyde resin in admixture with rubber latex would assist in forming a secure bond between the rubber and the reinforcement. Such adhesives, named "RFL" after the initials of the three principal components, came into wide commercial use. Later, when cellulosic fibers such as rayon were replacing cotton, it was suggested that RFL adhesives were inadequate for use with the new reinforcing materials and that the resorcinol/formaldehyde resin should be replaced with one in which the principal component (on a molar basis) was formaldehyde, the second component, representing a minor proportion of the total, was aniline, and the third component, representing the smallest portion of all was resorcinol. Nevertheless, the commercial use of RFL latexes continued and the foregoing alternate suggestion was apparently rejected, either because the suggested inadequacy of the RFL systems was more imaginary than real, or the suggested replacement offered insufficient improvement to make up for the extra trouble involved. The suggested replacement resin was to be formed "in situ." That is, the formaldehyde, aniline and resorcinol were to be mixed in the tire-building or cord-coating plant, in unreacted form with the rubber latex, and unreacted in the presence of the latter during a lengthy ageing period (e.g. 24 or as much as 48 hours). The handling of aniline in the tire building and cord-coating plants, where the personnel were not ordinarily knowledgeable in chemistry, would have been a potentially hazardous operation, since aniline, in unreacted form, is highly toxic. Also, it appears that the suggested formaldehyde/aniline/resorcinol (in order of the quantity present) replacement resin would have generated bonds which, on account of excessive flexibility, would have been deficient in high temperature dynamic performance. In any event, whatever, the reasons, the use of RFL adhesives, without aniline, continued, but the suggestion of forming the resin "in situ," in the presence of the latex, was accepted.

As various types of fibers formed from synthetic polymers became available, their use in rubber reinforcement was investigated, and one such type, polyamide fibers, commonly referred to as nylon, achieved a position of considerable importance along with rayon. RFL adhesives formed in situ were adopted for use with nylon reinforcement, and such use, along with use on rayon fibers, continues today.

Linear polyester fibers were discovered in the early forties, and in the late forties were intensively evaluated for use in tire cords—with disappointing results. Thus, although the prices in the U.S.A. of heavy denier polyester and nylon yarns were similar in the early fifties, no polyester reinforced tires were available in the U.S. at that time. Recognition in the late fifties of the need for improving upon the performance of nylon cord encouraged tire manufacturers to reappraise their tire cord fibers, including reexamining polyesters. This reexamination showed the physical properties of polyester superior to nylon on a number of counts, but also disclosed one notable and critical short-coming—extremely poor adhesion to rubber.

Thus, in the late fifties began an exhaustive search for a tire cord adhesive which would overcome this shortcoming. According to F. J. Kovac and T. M. Kersker in their paper entitled "The Development of the Polyester Tire," Textile Research Institute, 33rd Annual Meeting, Mar. 14, 1963, none of the adhesive systems existing in 1958 were adequate for use with polyesters. In their U.S. patent application filed Oct. 24, 1961, now U.S. Pat. No. 3,179,547, commenting specifically on the RFL adhesive, Kigane, Togawa and Yamada point out that it "does not give satisfactory results in case of the adhesion of polyester textiles to rubbers." A similar conclusion was put forth by Aitken, Griffith, Little and McLellan in their February 1965 "Rubber World" article on their isocyanate trimerization product-modified tire cord adhesive.

Because of the inadequacies of RFL adhesive systems, the art considered three possible alternative routes to improved bonding of polyesters to rubber: modification of the polyester fibers themselves to improve their adhesiveness; or modification of the existing resorcinol-formaldehyde latex (RFL) systems, such as through introduction of carboxyl groups; or the development of new adhesives having two different sets of functional groups, one of which was reactive towards rubber, the other towards polyester. The first alternative was not emphasized due to anticipated delays in achieving the ultimate objective. The second alternative, that of modifying existing RFL systems, was vigorously pursued but, according to Kovac and Kersker, without success. Then, the third alternative was vigorously pursued with considerable investments of money and manpower, and eventually an isocyanate-based polyester tire cord adhesive system was developed which would give commercially acceptable bonding. Polyester reinforced tire cords containing isocyanate-based adhesives have been available commercially since 1962.

While isocyanate-base adhesives have provided a means for obtaining more durable adhesive bonding of polyesters, they have also introduced certain inconveniences and hazards into tire manufacturing. Two stage processes, involving two separate applications of adhesive to the fiber (two "dips") are frequently required to develop maximum adhesion. Also, the isocyanates are toxic and expensive. Treated cord shelf life is poor, and some reports have indicated poor film creep characteristics. Accordingly, a need remains for improvements in polyester tire cord adhesives.

OBJECTS

It is the principal object of this invention to fulfill the above need. Still another object is to provide an improved adhesive system for bonding polyester reinforcement to rubber. Still another object is to provide an improved adhesive system for forming a commercially acceptable bond between a polyester cord and the rubber in a pneumatic tire in a single dip process. Still another object is to provide an improved adhesive system for forming a commercially acceptable bond between a polyester cord and the rubber in a pneumatic tire with or without toxic isocyanates and the extra precautions required in the handling thereof. Yet another object is the provision of a reinforced rubber article such as a pneumatic tire embodying adhesives of the aforementioned character. Another object is the provision of a process for conducting a condensation reaction between a polyhydric phenol, an aldehyde and an aromatic amine for producing an adhesive having the requisite properties for use in resin-latex adhesive systems for bonding polyester fibers to rubber. Other objects of the invention will suggest themselves to persons of ordinary skill in the art upon consideration of the following discussion.

BRIEF SUMMARY OF THE INVENTION

It has been found that the objects of the invention can be attained with an adhesive composition containing a highly stable two stage condensation resin which consists essentially of the reaction product of a polyhydric phenol, an aldehyde, and an aromatic amine modifying agent having the formula:

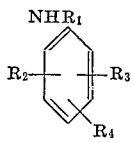

Wherein $R_1$, $R_2$, $R_3$ and $R_4$ can be hydrogen, alkylene, aryl or cycloalkyl, for example, methyl, ethyl, propyl, isopropyl, butyl, isobutyl, sec-butyl, t-butyl, amyl, isoamyl, t-amyl, hexyl, heptyl, octyl, 2-ethyl hexyl, isooctyl, tertoctyl, nonyl, isononyl, dodecyl, octadecyl, propenyl, hexenyl, actenyl, oleyl, decenyl, eicosyl, phenyl, benzyl, α-methyl benzyl, dimethylbenzyl, dimethylphenyl, tolyl, xylyl, cyclohexyl, cyclophenyl and naphthyl. $R_2$, $R_3$ and $R_4$ can also be alkoxy, halogen, nitro, amino or substituted amino groups such as $NHR_1$ wherein $R_1$ is as defined above.

The term "two stage" throughout this specification and in the appended claims, refers to resin which have been produced with amounts of ingredients and conditions which have been selected to avoid production of a thermosetting product. It is important that the resin used in the invention not be rendered thermosetting in character until after admixture with the latex and application to the reinforcement. Accordingly, the relationships which exist between the amounts of reactants in the aforementioned two stage resin are essential features of the invention. Throughout this specification and claims, except where the contrary is clearly indicated, the amounts of such reactants will be expressed in terms of moles (molecular weight units). Specifically, the number of moles of reacted polyhydric phenol must substantially exceed both the number of moles of reacted aldehyde and the number of moles of reacted aromatic amine in two stage resin. Thus, for each mole of reacted polyhydric phenol, the two stage resin should include a minimum of about three tenths of a maximum of about eight tenths of a mole of reacted aldehyde. If the resin contains unreacted aldehyde prior to admixture with the latex, suitable precautions must be taken to prevent its conversion to excess reacted aldehyde, either by control over conditions of storage and use, and/or the addition of "temporary" reaction inhibitors (e.g. such as would not be effective under the conditions employed in the drying of the coated reinforcement). The number of moles of reacted aromatic amine should be in the range of from about one tenth to about one and one tenth times the number of moles of reacted aldehyde, and no less than about one twentieth times the number of moles of reacted polyhydric phenol. Preferably the amounts of reacted aldehyde and aromatic amine present in the two stage resin both fall in the range of about 0.3 to about 0.7 mole per mole of reacted polyhydric phenol, and the number of moles of reacted aromatic amine is at least about half the number of moles of aldehyde.

The above-described resin is prepared in a liquid state and contains about 50% to about 80% by weight of resin solids, plus water resulting from the condensation reaction as well as water which may have been introduced with the aldehyde. An aqueous dip-coating solution is formed by mixing the resin with an aqueous synthetic or natural rubber latex, and sufficient additional aldehyde to convert the resin to a thermosetting state in the presence of the rubber of the latex and in contact with the polyester of the fibers (e.g. tire cord) coated therewith. The weight ratio between the rubber solids in the synthetic or natural rubber latex and the resin solids in the above-described resin, herein after referred to as the "rubber to resin ratio," is in the range of about 12:1 to about 2:1. The amount of additional aldehyde that is required can readily be determined empirically by routine experiments, or it can be calculated. Generally speaking, if the molar ratio between the sum of the moles of aldehyde incorporated in the two stage resin and of the moles of additional aldehyde incorporated in the dip coating solution bears a ratio on the order of about 1:1 to about 2.5:1 to the moles of polyhydrin phenol in the resin, the resin can readily be converted to thermosetting form in the subsequent treatment of the coated polyester fiber. The dip coating composition may also contain other conventional dip coating additives, and will contain sufficient water to provide a total solids content in the range of about 10% to about 30% by weight.

In accordance with the invention, a dip coating composition, as above described, is applied by any suitable method to polyester fibers, and dried in a drying zone maintained at a temperature of about 250° F. to about 450° F. for a time in the range of about 40 seconds to about 10 minutes, it being understood that when temperatures at the lower end of the above range are employed, residence times approaching the maximum of 10 minutes are required, and vice versa. The dip coating composition is applied in sufficient amount to increase the weight of the dried fibers by an amount in the range of about 1% to about 15% by weight of the uncoated fibers.

Thereafter, the dried, coated fibers are brought into contact with (e.g. embedded in) a vulcanizable, compounded rubber stock. The stock and fibers are then subjected to sufficient heat and pressure to form a bond through the dried adhesive between the polyester fiber and the rubber, and to vulcanize the rubber and form it into a desired shape.

Among the various aspects of the present disclosure which are believed to represent novel and unobvious advances over the prior art, are the above described adhesive composition, use of such an adhesive composition in the coating of reinforcing fibers, especially polyester fibers, the coated fibers resulting from such use, the reinforced rubber products prepared from solid rubber and textile reinforcement coated with such adhesives and the process of preparing the resin used in the adhesive system. Various aspects of these compositions, articles of manufacture and processes not included in this summary will be disclosed in the examples and description of a preferred embodiment contained hereinafter.

ADVANTAGES OF THE INVENTION

With our new and novel dip-coating composition only a single dip adhesive system is necessary, and the troublesome isocyanates can be eliminated from the adhesive recipe with little or no substantial sacrifice in bond strength. Specifically, industry-recognized adhesion tests have shown that polyester fibers treated with only a single dip in the adhesive system of the invention, and like fibers treated with two dips in the conventional isocyanate system, bond to rubber with at least substantially similar bond strength. In fact, a single dip with an adhesive system containing a given amount of the resin described herein may result in better bond strength than two dips with an isocyanate adhesive containing a larger quantity of conventional resin. Accordingly, it is believed that the present invention provides unexpected bonding strength improvements over isocyanate systems. On the other hand, if an even greater increment of improvement in bond strength is desired, or if other reasons justify such action, a conventional isocyanate coating may be applied to polyester fibers after, during or, preferably, prior to treatment with the adhesive of the present invention. An isocyanate predip followed by treatment with our adhesive system, makes possible the formation of bonds of superior strength between vulcanized rubber and polyester fibers embedded therein. Specimens used in adhesion studies show that failure occurs between the adhesive and the rubber. The adhesive on the cord remains intact, indicating a tenacious bond to the polyester. As a result of the tenacious bonds obtained through the use of the invention, polyester cord-reinforced pneumatic tires exhibiting superior high speed performance (and therefore safety) have been produced. The superior bond strength of our adhesive system also results in improvements in the performance of other rubber articles, or makes it possible to obtain previously acceptable levels of strength with less adhesive.

The adhesive system of the invention offers an additional advantage over the isocyanate systems in respect to toxicity. When aniline is formed into a two stage resin, as above described, little or no toxicity is observed and the resin can be handled safely by unskilled personnel. Where the two stage resin is prepared in a resin plant separate from the tire building or cord-coating facility, as will usually be the case, rubber company employees who are unknowledgeable in matters of chemistry will not be subjected to the necessity of preparing a toxic aniline-containing reaction mixture.

Because the two stage resin used in the invention is not prepared in situ, no lengthy ageing operation in the tire, plant is required. Thus, the provision of storage vats in the cord-dipping facility for ageing adhesives can be eliminated. Also, the difficulties of disposing of partially reacted adhesive in case of sudden work stoppages are reduced. Furthermore, the lead time for getting back into production after a work stoppage is reduced.

In situ preparation of adhesives in the tire-building or cord-coating plant has other disadvantages which are overcome through use of the present invention. These reactions are often carried out at ambient temperature with little or at best imprecise control over the temperature prevailing in the adhesive-forming mixture. Consequently, the extent of reaction of the resin forming ingredient varies, sometimes resulting in the formation of a nonliquid or stringy mass which is completely unsuitable for the coating operation. Because the in situ preparation of RFL adhesives is commonly conducted at more or less ambient temperature, depending upon the rate of addition of the materials and the exotherm that is experienced, it is frequently necessary to introduce a large excess of formaldehyde to get the minimum desired amount of formaldehyde to react; thus substantial amounts of unreacted formaldehyde are present in the aged adhesive. After the adhesive is applied to the reinforcement, it is dried, and such unreacted, excess formaldehyde will be vaporized in the drying oven, creating disagreeable, poisonous fumes and wasting the formaldehyde so released. The present invention eliminates the necessity of having large excesses of unreacted aldehyde in the cord-treating adhesive.

The invention offers other advantages over conventional RFL adhesives. The conventional resorcinol-formaldehyde resins employed in cord dip adhesive recipes have a retarding effect on cure during vulcanization. The resins of this invention exert an accelerating effect on the cure rate during vulcanization. Also, static and dynamic adhesion tests as well as heat durability tests have demonstrated that tire cords can be bonded in superior manner with the improved adhesive systems of the invention, giving considerably improved results over the conventional resorcinol-formaldehyde rubber latex tire cord adhesive.

Phenolic resins have never demonstrated the bonding qualities of resorcinol resins in tire cord dip adhesive applications. Although aniline modified phenolic resins are well known for their utility in electrical grade laminating resins and molding compounds, their performance in tire cord dip applications has never equalled that of dips based on conventional resorcinol resin adhesives.

Little work has been done in the past with aniline modified resorcinol-formaldehyde resins because the reaction which occurs between resorcinol and formaldehyde in the presence of aniline is extremely exothermic and difficult to control as compared to similar reactions between resorcinol and formaldehyde. The aniline markedly accelerates the rate of reaction and therefore the rate of heat generation, making possible an explosive reaction or the production of undesirable precipitates. It is only because of special techniques we have developed that we have been able to produce the aniline modified resins of the invention commercially with a high degree of safety and product uniformity.

Useful materials

As the polyhydric phenols possessing the qualifications for use in the operation of this invention may be mentioned those having the hydroxyl groups in the benzene nucleus meta with respect to one another such as resorcinol, phloroglucinol, orcinol and similar compounds. It should be understood, however, that the invention is not limited to these specific polyhydric phenols. Dihydric phenols, especially resorcinol, are preferred.

Most commonly, formaldehyde is the aldehyde used, on account of its reasonable cost and ready availability.

It may be introduced in aqueous and/or alcoholic solution, as powder, or in any other suitable form. However, other aldehydes which are capable of complete reaction with the polyphenol and aromatic amine may also be used in the invention. For instance furfuraldehyde, acetaldehyde, or crotonaldehyde may be substituted wholly or in part. Likewise, instead of formaldehyde materials may be used which yield formaldehyde such as for example hexamethylenetetramine. Furthermore, certain reaction products of formaldehyde which will condense or polymerize with polyhydric phenols and additional compounds capable of polymerizing with an aldehyde may be used such as for example the reaction product of formaldehyde and dimethylamine.

As indicated by the above structural formula, the various aromatic amines used in the present invention include derivatives of aniline, including for example N-methylaniline, o, m, or p-toluidine, o, m, or p-nitroanilines, 2,4-dinitroaniline, o, m, or p-phenylenediamines, o, m, or p-anisidine, o, m, or p-chloroaniline, 2,4,6-trichloroaniline, 2,5–3,4- or 3,5 p-dichloroaniline, diphenylamine, benzidine, isopropyl aniline, N,N-diphenylbenzidine, p-anilinophenol, o, m or p-aminophenol, and so forth.

Of the various aniline derivatives which can be used, aniline, o-toluidine and the phenylenediamines have given outstanding results and consequently these are especially recommended for achieving best results according to the invention.

When used in forming the modified resin of the present invention, it is believed that the $NH_2$ or $NHR$ group does enter into the condensation reaction. Chemical union with the polyhydric phenol-aldehyde components is apparently achieved via the Mannich reaction. The Mannich bases thus formed are believed to function also as accelerators during vulcanization.

Usually, it is desirable to prepare the resin in the presence of a small amount of catalyst or condensing agent for the polymerization reaction. Such catalysts or condensing agents are usually materials which are basic in nature. Of these diethylenetriamine is most commonly employed. Other substances may, of course, be used such as for example, other polyfunctional and monofunctional primary, secondary, and tertiary amines or ammonia may be substituted, or these can be eliminated entirely, though these are preferred as catalytic agents in this reaction. Of the various aliphatic amines which can be employed as the catalytic agents diethylenetriamine has given outstanding results and consequently is preferred for achieving best results according to the invention. Nevertheless, ammonia, ethylenediamine, triethylenetetramine, tetraethylenepentamine, triethylamine, diethylamine, dimethylamine and the like can be substituted for diethylenetriamine with good results. Alkali metal hydroxides such as sodium, barium, potassium and lithium hydroxide can also be employed as catalysts.

When the catalytic agent is ammonia, a primary or a secondary amine or a polyamine, it undergoes reaction with the formaldehyde and resorcinol present.

The amount of catalyst employed should be any amount up to about 0.5 mole, and preferably up to about 0.1 mole, per mole of polyphenol, said amount being an amount which is effective to cause substantially complete condensation of the resin-forming reactants.

Suitable latexes for use in the present invention may be selected from the group consisting of natural rubber latex or a latex of conjugated diolefin polymer synthetic rubber, or mixtures thereof, or an aqueous dispersion of reclaim from such rubbers, or mixtures of any such latices and reclaim dispersions. Such conjugated diolefin polymer synthetic rubbers are polymers of butadienes-1,3, e.g. butadiene-1,3, isoprene, 2,3-dimethyl-butadiene-1,3 and polymers of mixtures thereof and copolymers of mixtures of one or more such butadienes-1,3, with one or more other polymerizable compounds which are capable of forming rubber copolymers with butadienes-1,3, for example, up to 60% by weight of such mixture of one or more monoethylenic compounds which contain a

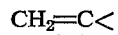

group where at least one of the disconnected valences is attached to an electro-negative group, that is, a group which substantially increases the electrical dissymmetry or polar character of the molecule. Examples of compounds which contain a $CH_2{=}C{<}$ group and are copolymerizable with butadienes-1,3 are aryl olefins, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl - 5 - vinyl pyridine; methyl vinyl ketone. Examples of such conjugated diolefin polymer synthetic rubbers are polybutadine, polyisoprene, butadiene-styrene copolymers (SBR) and butadiene-acrylonitrile copolymers.

Various natural rubber latices have been successfully used heretofore in cord-dipping processes. Among the various commercially available natural rubber latices are the so-called "normal latex," centrifuge-concentrated natural latex, creamed-concentrated natural latex, evaporation-concentrated natural latex, electrodecantation-concentrated natural latex and other forms of natural rubber latex commercially available and known in the art as Hevea latex such as *Hevea brasillensis* latex. A heat concentrated natural rubber latex which has been concentrated after the addition of soap and caustic according to the Revertex process as described in British Pat. No. 243,016 and known as "Revertex" contains 72 weight percent solids, a dry rubber content of 67%, a specific gravity of 0.97 and a density of 8.1 pounds per gallon.

However, the preferred latex for use in the present invention is an aqueous emulsion or dispersion of vinyl-pyridine - butadiene - tyrene terpolymer latex. Various commercially available latexes of this type are available under the trade names "Gentac" (General Tire), "Hycar 2518" (Goodrich) and "Pyratex B" (Naugatuck). These terpolymers may comprise, in parts by weight, from 50 to 95 parts butadiene, 5 to 50 parts vinylpyridine and, per 100 parts of butadiene/vinyl-pyridine, from 5 to 30 parts styrene. Typically suitable terpolymers for use herein are described in Mighton 2,561,215; Cislak et al. 2,402,020 and Wilson 2,652,353.

The terms "fiber" and "fibrous" are both used in a generic sense in this disclosure and in the appended claims to refer to textile elements suitable for rubber reinforcement purposes which are fibers, or which contain fibers, including filaments, fibers, yarns, strands, woven fabrics, cords, cord-fabrics and the like. The polyesters from which these fibers are manufactured are the high molecular weight polyesters obtained from $\alpha,\omega$ - glycols and dicarboxylic acids, particularly any one of the high molecular weight polyesters obtained from polymethylene glycols and the aromatic dicarboxylic acids. As the most typical of these can be cited polyethylene terephthalate which is obtained from ethylene glycol and terephthalic acid. Also, for example, there are the polyester fibers spun from polycyclohexane - 1,4 - dimethylol terephthalate. Suitable polyester copolymer and homopolymer fibers are commercially available under a variety of trade names, including "Dacron" (Dupont), "Fortrel" (Fiber Industries), "Kodel" (Tennessee Eastman), "Terylene" (ICI—England, CIL—Canada), "Vyta-Cord" (Goodyear), and others.

The solid rubber used in the present invention for making the rubber and fabric laminates for use in tire manufacture and for other purposes may be natural (Hevea) rubber or conjugated diolefin polymer synthetic rubber or mixtures of any of them including their reclaims. The rubber is preferably a rubbery butadiene-1,3 polymer, including polybutadiene and butadiene copolymers, (e.g. the copolymers of butadiene-1,3 with styrene) particularly the rubbery polymer resulting from the polymerization of a mixture comprising about 75 parts of butadiene and about 25 parts of styrene may be used. In its preferred form the invention contemplates any commercially compounded rubber stock employed in the manufacture of pneumatic tires, hose, conveyor belts and other industrial reinforced-rubber products. The rubbery material may also include any of the well-known compounding ingredients for rubber, such as vulcanizing agents and accelerators, antioxidants, fillers, reinforcing agents, emulsifiers, stabilizers, modifiers, and coloring agents, etc., in amounts and proportions in accordance with conventional compounding technique.

Preparation of the resin

The ingredients of the resin employed in this invention are highly reactive. Under some conditions, the simultaneous bringing together of all of the polyhydric phenol, aldehyde and aromatic amine in the proportions set forth therein will result in an almost explosive reaction. In other cases, thick non-uniform precipitates will form in the product, rendering it unsuitable for cord-dipping purposes. Knowing of such tendencies, one would normally conclude that the manufacture of a resin containing polyhydric phenol, aldehyde and aromatic amine in the proportions set forth herein would be hazardous, and that the quality level of the resin would not be dependable. However, a procedure has been discovered for bringing the reactants together and for conducting the reaction efficiently while avoiding the dangers of explosive reactions and precipitation.

It has been found that when at least about 0.12 mole of organic amine per mole of polyhydric phenol is included in the resin, it is preferable to react it first with aldehyde. The desired mole ratio of amine to aldehyde used in this preliminary reaction should be about 1:1. The reaction will take place readily at room temperature but heat is generally used to promote polymerization and prevent excessive thickening of the solution. The reaction product is then reacted with polyhydric phenol. If desired, the resultant resin is further reacted with additional aldehyde or aldehyde donor such as paraformaldehyde.

When a small portion of organic amine (e.g. less than about 0.12 mole per mole of polyhydric phenol) is to be used, the polyhydric phenol, amine, catalyst (if any) and water may be combined and heated if desired. Aldehyde may then be added slowly with cooling to maintain the temperature at a desired level (usually 50–110° C.).

The preferred form of resin contains sufficient organic amine to exceed the 0.12 mol level mentioned above. Accordingly, the preferred procedure is to react the resin-forming materials in three stages. In the first stage, the aldehyde, and the organic amine are reacted, preferably in the presence of diethylenetriamine. The polyhydric phenol is then added and the reaction is continued further. Additional aldehyde is then added and the reaction is completed.

The reactions are normally carried out at temperatures in the range of about 60° C. to about 130° C., under reflux. These temperatures are not critical, but instead represent workable temperature ranges in which the reaction products can be produced at a reasonably rapid rate for commercial operations. While the reactions will take place at higher or lower temperatures, problems of temperature control, excessive vaporization of reactants and uneconomical manufacturing output may be encountered which make the higher or lower temperatures less desirable.

The reactions may be conveniently carried out in aqueous medium and, if desired, additional organic solvents may also be employed. For example, low molecular weight alcohols, ketones and esters such as methanol, acetone and ethyl acetate may be added to the reaction mixture to help dissolve the various components where such is desired or necessary.

DESCRIPTION OF A PREFERRED EMBODIMENT

Figure 1:
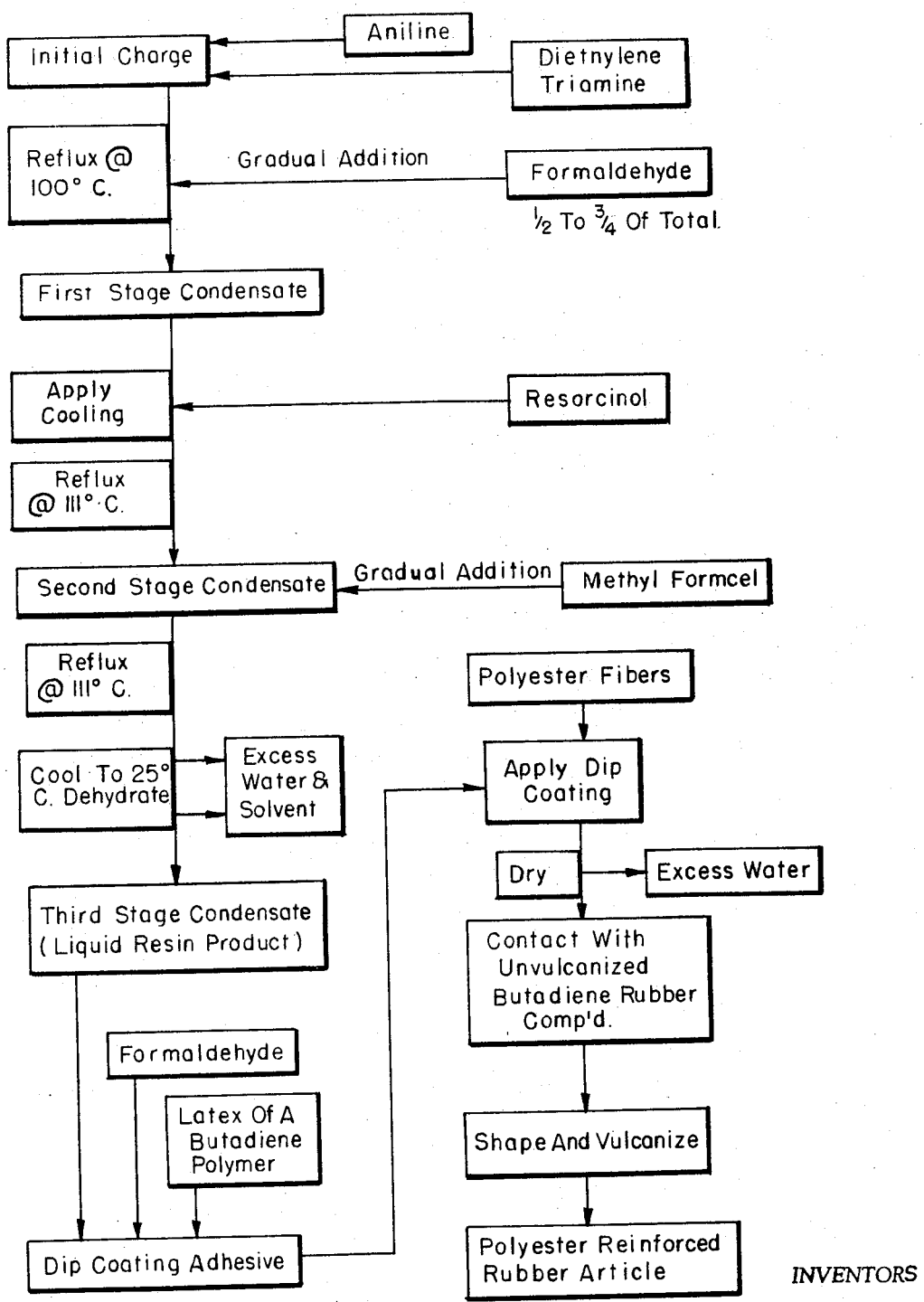
FIG. 1 is a simplified flow sheet of the preparation of the preferred adhesive system, its application to polyester fibers, and the manufacture of a reinforced rubber article therefrom.

In accordance with a preferred embodiment of the invention as diagrammed in FIG. 1, the preparation of the resin for the dip-coating adhesive of the present invention is begun with the formation of an initial charge or mixture of aniline and diethylenetriamine to a reaction vessel equipped with a condenser and agitator. About 0.02 mole of diethylenetriamine and 0.35 mole of aniline are used for each mole of resorcinol included in the resin. The resultant mixture is heated to and maintained under reflux at 100° C. Aqueous formaldehyde is gradually introduced to the agitated contents of the reaction vessel over about a 13 minute period in the form of an aqueous formaldehyde solution having a formaldehyde concentration in the range of about 35 to about 50 percent (e.g. 44% methanol free). About 0.35 mole of formaldehyde are introduced for each mole of resorcinol. Preferably, reflux at 100° C. and agitation are continued for 60 minutes after completion of the addition of the formaldehyde. This completes the first stage of the reaction, in which there is condensation of aniline with formaldehyde. This stage of the reaction may be conducted at temperatures in the range of about 60° C. to about 115° C., for about ½ to about 3 hours, but 100° C. for about 1 hour is considered best. The resultant first stage condensate is then cooled, e.g. to about 70° C., and the resorcinol is added. At this temperature, the addition of the resorcinol to the reaction mass may be carried out gradually over a period of 30 minutes, in which case, sufficient cooling and agitation to maintain the temperature at or below about 70° C. are applied. If the reaction mass containing the first stage condensate of aniline and formaldehyde is at a significantly higher temperature when the resorcinol is added, it may then be necessary to add the resorcinol very rapidly. The object of such rapid addition is (a) to apply cooling to the reaction mass as a result of the absorption of heat by the resorcinol as it goes into solution and (b) to minimize the period of time during which the first stage condensate and resorcinol are in contact with one another at levels of concentration which could, upon longer exposure, lead to an almost explosive reaction. Alternatively, all of the resorcinol may be placed in a separate vessel in a cool condition and the hot reaction mass may be added thereto. In any event, whatever the mode of addition of the resorcinol, resorcinol is then caused to react with the first stage condensate. This may be accomplished by holding the reaction mixture at a temperature in the range of about 60° to about 130° C. for about ½ to about 1½ hours, but refluxing for about ½ hour at 111° C. is considered best. The result is a second stage condensate, to which additional formaldehyde is introduced in the form of a solution in a lower alcohol having from 1 to about 4 carbon atoms, such as methanol, N-propanol, N-butanol, iso-butanol, and so forth. Alternatively, the additional formaldehyde may be introduced in the form of a water solution, as above described, or in the form of a solid, such as paraformaldehyde powder. However, if these alternatives are used at this stage in the reaction, it may be necessary to cool the reaction mass considerably (e.g. to less than 50° C. or to room temperature) prior to addition of the aqueous formaldehyde or powder and then reheat the resultant mixture to complete the reaction. Otherwise, undesirable precipitates form rather readily, spoiling the product. Thus, superior efficiency is obtained when using the Formcel solutions in that if the Formcel is added gradually, the addition can be made while the reaction mass is at an elevated temperature (e.g. above about 60° C., preferably above about 80° C.) and the reaction may be promptly continued without reheating from below 50° C. to reaction temperature. In any event, whatever the form in which the additional formaldehyde is added, about .17 mole of additional formaldehyde is added for each mole of resorcinol. The methyl Formcel, when used, is preferably added slowly over a 10 minute period while maintaining temperature in the reaction mass at about 80° to about 105° C., it being considered best to start the addition at about 85°–90° C. and to permit the temperature to rise, as a result of the exotherm to a mild reflux (e.g. about 101° C.). The formaldehyde is then caused to react with the second stage condensate by holding the reaction mass at a temperature in the range of about 60° C. to about 130° C. for about ½ to about 1½ hours, refluxing and agitating at 111° C. for about ½ hour being preferred. Thereafter, the resultant third stage condensate, a liquid two stage resin product having a dark red color, is cooled with vacuum dehydration and removal of solvent to 50° C. The removal of solvent is controlled so that the finished resin will have a total solids content of about 50 to about 80%. Generally, the viscosity (Brookfield viscosimeter—25° C.) of the finished resin will fall in the range of about 1 to about 300 poises, with about 20 to about 150 poises being preferred. The pH may vary from about 5 to about 10, with about 5.5 to about 8 being preferred. A representative resin prepared in accordance with the preferred procedure set forth above had a total solids content of 70.5%, a viscosity of 73 poises and a pH of 6.9.

Where less than 0.12 mole of the aniline per mole of resorcinol is used, the formaldehyde may be gradually added to a mixture of the resorcinol, aniline and diethylene triamine with agitation and sufficient cooling to maintain a temperature of less than about 90° C. in the reaction mass until the exotherm dissipates, and thereafter a temperature in the range of about 60° to about 130° C. is maintained until the reaction is complete. Thus, the reaction may be completed in a single stage.

The following examples illustrate various resin formulations usable in the present invention, and the manner of preparing them. All parts are by weight, unless the contrary is clearly indicated.

EXAMPLE 1

905 parts of aniline and 53 parts of diethylenetriamine were charged to a reaction vessel equipped with a condenser and agitator. The solution was heated to reflux. At reflux (approx. 100° C.) formaldehyde (44%, methanol free) addition was begun. A total of 663.5 parts of formaldehyde was added over a 42 minute period. Reflux was continued for 60 minutes after formaldehyde addition was completed.

At this point the resin was cooled slightly and 3016 parts of resorcinol was added. Cooling water was kept on the reaction vessel while resorcinol was being added. The resin was then heated to reflux (115° C.) and refluxed for thirty minutes.

The resultant product was cooled to 25° C. A charge of 146.5 parts of paraformaldehyde powder was added and the resin was heated to reflux and refluxed for 35 minutes, cooled and poured.

The finished resin had a viscosity at 25° C. of 119 poises, a pH of 6.83 and a solids content of 70.8%, and was stable at ambient temperatures for an extended period.

EXAMPLE 2

88.8 parts of aniline, 5.25 parts of diethylenetriamine, 300 parts of water, and 1500 parts of resorcinol were charged to a reaction vessel equipped with a condenser and agitator. The mixture was heated to 35° C. and the slow addition of a 400 part portion of formaldehyde (48.5% methanol free) was begun. Temperature of the reaction mixture was allowed to exotherm to 50° C. at which point all the resorcinol was in solution.

Total formaldehyde addition took 33 minutes. Enough cooling water was used to hold the temperature of the resin to 66° C. at the completion of formaldehyde addition.

The resin was heated to reflux (104° C.) and refluxed for 30 minutes, cooled and poured.

The finished product was a stable 63% solids resin with a pH of 6.00 and a viscosity at 25° C. of 3.3 poises.

EXAMPLE 3

1508 parts of aniline and 53.4 parts of diethylenetriamine were charged to a reaction vessel and heated to 90° C. 663.5 parts of formaldehyde (48.5%, methanol free) was added slowly. An exothermic reaction occurred which carried the resin to reflux in twenty (20) minutes. Formaldehyde addition was continued at reflux. Total time for formaldehyde addition was 54 minutes.

Reflux was continued for an additional 60 minutes. The reaction mixture was cooled to 30° C. and a charge of 3016 parts of resorcinol was added. The resin was heated to reflux (112° C.) and refluxed for 30 minutes.

The resin was cooled to 60° C. and 146.5 parts of paraformaldehyde was added. The resin was heated to reflux and refluxed until solution of paraformaldehyde was completed.

The resultant resin was a 79 poise, 64% solids product with a pH of 7.30.

EXAMPLE 4

1314 parts of N-isopropylaniline and 53 parts of diethylenetriamine were charged to a reaction vessel equipped with a condenser and an agitator. The solution was heated to reflux. At reflux (approx. 100° C. formaldehyde (44% methanol free) addition was begun. A total of 663.5 parts was added over a twelve (12) minute period while maintaining the temperature above 92° C. The reaction was maintained at reflux for 60 minutes.

The resin was then cooled to 40° C. and 3016 parts of resorcinol was added. The resin was heated to reflux (115° C.) and refluxed for thirty (30) minutes, cooled and poured.

The finished resin was a very dark, viscous solution containing 53% solids and having a pH of 6.89. This resin exhibited excellent stability.

The following example illustrates the preparation of a dip-coating adhesive.

EXAMPLE 5

The aforementioned representative resin is mixed with water, formaldehyde and caustic (sodium hydroxide) to prepare a mixture identified as "Composition A," and a butadiene polymer latex is mixed with water to form "Composition B." Compositions A and B include the following parts by weight of the enumerated materials:

Composition A

| | |
|---|---:|
| Resorcinol - formaldehyde - aniline resin described above (solids content 70.5%) | 19 |
| Water | 237 |
| Formaldehyde, 37% aqueous | 10 |
| Caustic, 20% aqueous | 3 |
| | 269 |

Composition B

Butadiene - vinylpyridine - styrene terpolymer latex
 (solids content 41%) _____ 244
Water _____ 61
                                            ___
                                            305

The dip-coating composition is prepared by mixing Composition A with Composition B, and the resultant mixture is ready for immediate use. The adhesive, as above constituted, is considered adequate, but it may be modified if desired by the addition of various materials such as: protein, for example, casein, gelatin, wheat protein, dried blood, wetting agents; other synthetic resins; filler, such as carbon black; rubber, such as artificial dispersion of rubber, especially reclaim rubber; and other known additives for tire cord dipping solutions, all of which may be added for a variety of purposes.

The most notable achievements of the adhesives of the invention have been noted in the manufacture of polyester fiber reinforced pneumatic tires. Worthwhile results include improvements in the rate of vulcanization, thus facilitating rapid production of the tire, as well as substantially improving the dynamic adhesion between the carcass and the tread stock thus improving the safety of the tire under high speed, high temperature driving conditions. By way of example and not limitation, FIGS. 2 through 4 disclose tires and other reinforced rubber goods in which the invention has utility.

Figure 2:
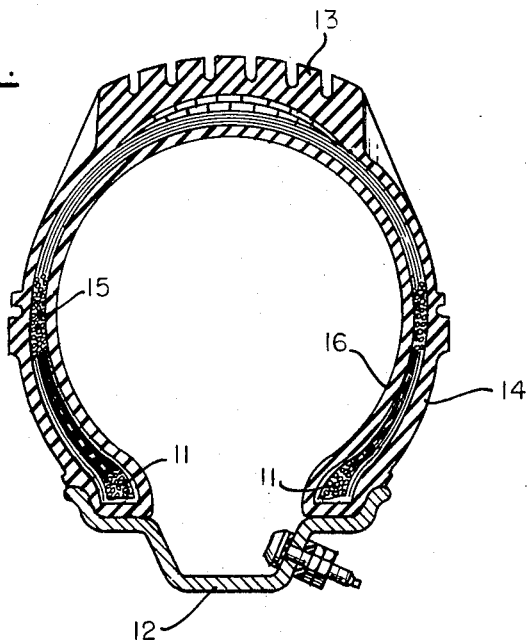
FIG. 2 is a vertical section of a pneumatic tubeless tire manufactured in accordance with the present invention.

Referring now to FIG. 2, said figure depicts a pneumatic tubeless tire which comprises a hollow toroidal type member which is substantially U-shaped with spaced bead portions 11—11, inside of which are a plurality of bead wires adhesively imbedded and molded in a rubber. The outer surface of the bead portion is advantageously formed into an air-sealing means to aid in adhesion to rim 12 when the tire is inflated. Typical air sealing means may comprise a layer of rubber disposed on the outer surfaces of the bead portions. Alternatively, the outer surfaces of the bead portions may contain a plurality of ribs or, if these surfaces are smooth, the tire rim may be roughened (for example by sand-blasting) and/or ribbed circumferentially or both circumferentially and radially in those areas where the outer surfaces of the tire bead portions contact the rim.

In any of the forgoing types of sealing means, a gumbo, dope, or cement comprising a soft, tacky, rubbery composition may be applied to the outer surfaces of the bead portions and/or the tire rim prior to mounting the tire. The particular structural details of the tire or rim surfaces do not constitute a part of the present invention. The outer surface of the tire also includes tread area 13 and sidewalls 14. The open portion of the horseshoe-shaped tire faces that portion of the inner circumference of the tire which is adjacent the said tread area 13 of the tire.

The remaining construction of the tire may vary according to conventional fabrication, but in general the tire is a multi-layered type of structure with an outer layer as above-mentioned. The layer next adjacent the outer layer generally comprises a carcass 15 which includes polyester fibers which have been treated with the above-mentioned cord-dipping adhesive, dried and then embedded in solid rubber, as above described, in accordance with the invention. The tire also includes an inner lining 16 and/or a tie-ply. This lining must be substantially impermeable to air. The above multilayers, at least three in number, are conventionally bonded or otherwise adhered together, for example, by cementing and/or especially by vulcanizing to form a tire of a unitary structure.

The expression "layer" as employed in this specification and in the accompanying claims is intended to include plies and liners, as well as such layers as the carcass, sidewalls, tread area, etc. of tires.

Persons skilled in the art are aware of a variety of cords composed of polyester fiber which are suitable for reinforcing pneumatic tires. For instance, one may employ a cord of about 2200 deniers having a structure of 51S x 51Z t./m. (twists per meter) which has been obtained by spinning 48 filaments of polyethylene terephthalate into a yarn, drawing this yarn to make it into 250 deniers, taking four lengths of this yarn and imparting an undertwist in the Z-direction, followed by imparting an upper twist in the S-direction to two of the four undertwisted lengths.

Figure 3:
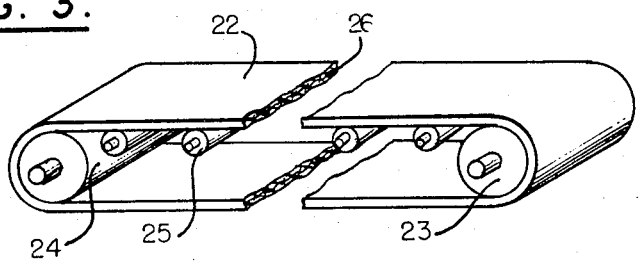
FIG. 3 is a generally edgewise perspective view of a conveyor belt structure produced in accordance with the present invention.

Other embodiments of the present invention comprise the use of the adhesion combinations of the present invention in conveyor belting, transmission belting and steam hose. FIG. 3 shows a conveyor belt 22 being in position on drive roller 23, idle roller 24, and idle support rollers 25. The belt consists of a rubber containing imbedded therein a fabric 36 composed of a plurality of plies of polyester (and if desired, other) filaments, cords or threads which have been coated with the adhesive system of the present invention, embedded in the rubber and then vulcanized.

Figure 4:
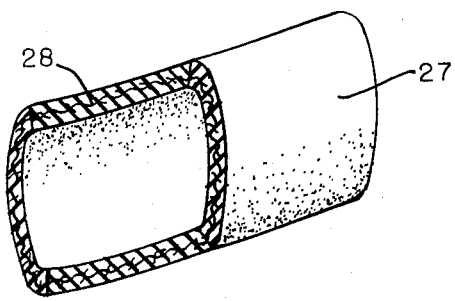
FIG. 4 is a perspective view, partly in section, of a portion of a hose produced in accordance with the invention.

FIG. 4 shows a central longitudinal section broken away of a flexible rubber steam hose 27 produced in accordance with the present invention. Again, as in the case of the conveyor belt, the steam hose consists of a rubber having imbedded therein polyester textile reinforcement bonded to the rubber through an adhesive comprising the above-described resin and latex.

The following example illustrates the application of the adhesive system of the invention to polyester fibers.

EXAMPLE 6

Two ply polyester tire cord of 1100 denier, with 13 t.p.i. singles and ply twists is run through a bath containing a mixture of Composition A and Composition B, as described above, with a solids pick-up of 9.2%. The dip treatment and the drying treatment which follow are conducted under light tension. The cords are dried to an essentially non-tacky but uncured condition during 3 minutes treatment in a drying chamber in which the drying medium (hot air) was maintained at a temperature of about 375° F. The cords are ready for use, but may be wound up on rolls for storage and future use if desired, without ill effects.

The following example illustrates the preparation of a blocked polyisocyanate for incorporation in a pre-dip or primer coat:

EXAMPLE 7

110 parts of resorcinol are reacted with 25 parts formalin (37% formaldehyde) in the presence of about 20 parts water while refluxing at about 100° C. for about 15 minutes. An additional 30 parts of said formalin are added over a 10 minute period followed by an additional 30 minutes of refluxing. The resultant thick syrupy resin has a solids content of 60%, a viscosity of 750 cps. and a pH of about 7.

20 parts of the foregoing resin are reacted with 6 parts of a mixture containing 60 parts of methylene triisocyanate and 40 parts of methylene diisocyanate for 48 hours at 72° F. to produce a resin-blocked polyisocyanate. After addition of 1/10 part of NaOH in 100 parts water, the blocked isocyanate is aged for about 8 hours, during which a clear, supernatant layer of water-soluble resin-blocked isocyanate forms, which may be skimmed off and used in a cord-dipping adhesive.

The following example illustrates the use of the adhesive system of the invention in conjunction with a polyisocyanate:

EXAMPLE 8

30 parts of the water-soluble resin blocked polyisocyanate formed in the supernatant layer in accordance with Example 7 are mixed with 70 parts of latex ("Composition B," as produced in Example 5). The resultant mixture is applied at room temperature to 1100 denier/2 ply polyester tire cord under a 1% stretch and at a dry solids pick up level of 4.2% by weight based on the dry uncoated cord and is then dried for 1 minute at 425° F.

The dried cord is then coated a second time, using only the adhesive system of the invention as prepared in Example 5. The second coat of adhesive is applied at room temperature with the cord again under a 1% strength at a dry solids pick up level of 5.0% (based on the dry uncoated cord) for a total solids pick up of 9.2%. The cord is dried at 425° F. for 2 minutes.

Where an isocyanate pre-dip is used, it is preferred that at least about ¾% of the isocyanate and 2½% of rubber be deposited. The preferred over-all range of pick-up for two dip as well as one dip procedures is in the range of about 5 to about 13%.

The following example illustrates the coating of tire cords with two isocyanate dips without the adhesive system of the invention:

EXAMPLE 9

The procedure of Example 8 is repeated, except that the resin-blocked polyisocyanate adhesive disclosed in the first paragraph thereof is employed in both coating steps. Equivalent solids pick-up levels and drying conditions are maintained.

The following are non-limiting examples of various unvulcanized solid rubber compounds which may serve as matrices for incorporation of the cords prepared in accordance with the invention, whereby composites may be formed:

EXAMPLE 10

| | |
|---|---|
| Natural rubber (smoked sheet) | 50 |
| SBR rubber (copolymer of 75 parts butadiene-1,3 and 25 parts styrene) | 50 |
| Reclaimed rubber (whole tire, 50% rubber) | 30 |
| Carbon black | 40 |
| Zinc oxide | 5 |
| Stearic acid | 1.5 |
| Pine tar | 4 |
| Light mineral oil | 4 |
| Antioxidant (condensation product of nonylated p-cresol and formaldehyde) | 1 |
| Accelerator CBS (N-cyclohexyl-2-benzothiazolesulfenamide) | 1.1 |
| Sulfur | 3.5 |

EXAMPLE 11

| | |
|---|---|
| Natural rubber | 100 |
| MPC black | 33 |
| Zinc oxide | 10 |
| Stearic acid | 2 |
| Pine tar | 2 |
| Antioxidant BLE (condensation product of acetone and diphenylamine) | 1.5 |
| Accelerator SNS (N-tertiary-butyl-2-benzothiazolesulfenamide) | 0.4 |
| Sulfur | 3.5 |

EXAMPLE 12

| | |
|---|---|
| Nitrile rubber (copolymer of 65% butadiene-1,3 and 35% acrylonitrile) | 100 |
| MPC black (medium processing channel black) | 50 |
| Zinc oxide | 5 |
| Stearic acid | 2 |
| Antioxidant, Catalin CAO–5 (2,2'-methylenebis-4-methyl-6-tertiary butylphenol) | 1.0 |
| Accelerator, Vulcafor F | 1.5 |
| Sulfur | 1.5 |

EXAMPLE 13

| | |
|---|---|
| Chloroprene polymer rubber neoprene GN | 100 |
| Carbon black | 36 |
| Zinc oxide | 5 |
| Stearic acid | 2.5 |
| Tricresyl phosphate | 2.5 |
| Antioxidant, Catalin CAO–5 | 1 |
| Magnesium oxide | 4 |

EXAMPLE 14

| | |
|---|---|
| Isoprene polymer rubber (cis-1,4-polyisoprene) | 100 |
| MPC black | 50 |
| Zinc oxide | 5 |
| Stearic acid | 3 |
| Pine tar | 2.5 |
| Antioxidant "Nonox B" | 1.0 |
| Accelerator mercaptobenzthiazole | 1.5 |
| Sulfur | 2.0 |

EXAMPLE 15

| | |
|---|---|
| Butyl rubber (copolymer of 98 parts isobutene and 2 parts isoprene) | 100 |
| MPC black | 24 |
| SRF black (semi-reinforcing furnace carbon black) | 16 |
| Zinc oxide | 5 |
| Extender oil (paraffinic base oil having: a specific gravity of 0.9; aniline point, 215° F.; S.S.U., 100° F., 508; S.S.U., 210° F., 58; pour pt. 30° F., flash pt. 365° F.) | 12.5 |
| Antioxidant, Catalin CAO–1 (2,6-di-tertiary-butyl-paracresol) | 1 |
| Tellurium diethyl dithiocarbamate | 1.25 |
| N-nitroso-p-nitroso methyl aniline | 1.0 |
| Sulfur | 2.0 |

EXAMPLE 16

| | |
|---|---|
| SBR rubber (copolymer of 72 parts butadiene-1,3 and 28 parts of styrene) | 100 |
| MPC black | 50 |
| Zinc oxide | 5 |
| Stearic acid | 1.5 |
| Pine tar | 3 |
| Extender oil (as in Example 15) | 20 |
| Antioxidant, CAO–5 | 5 |
| Accelerator SNS | 0.4 |
| Sulfur | 2.0 |

From the foregoing, it may be observed that the rubber compositions which are preferred for use in the present invention contain the following components (and, if desired, other components which do not destroy the essentially rubbery nature of the compositions) in about the number of parts indicated below:

| Component: | Parts |
|---|---|
| Rubber | 100 |
| Carbon black | 30–60 |
| Zinc oxide | 5–20 |
| Stearic acid | 1–4 |
| Accelerator | 0.2–2.5 |
| Antioxidant | 0.5–2.5 |
| Sulfur | 1–4 |

The compositions are mixed by conventional wet-masterbatching and/or dry milling techniques known to persons skilled in the art.

The dried cords treated in accordance with the invention are embedded in such rubber compositions by any suitable method to form a composite of such cords with the rubber matrix, and the matrix is then vulcanized with the treated cords in place therein. Suitable vulcanization conditions vary in a manner well understood by persons skilled in the art, depending in part upon the amounts of curatives present in the rubber compound, the thickness of the matrix and the type of article being formed, but generally the vulcanization conditions will be in the range of 0.5 to 90 minutes at about 200° to about 450° F., coupled with sufficient pressure to form the matrix to a desired shape.

Because various changes and modifications can be made without departing from the spirit and nature of the invention, it is understood that the invention is not to be limited except by the appended claims.

What is claimed is:

1. A rubber reinforcing element in the form of a polyester filamentary substrate having a coating comprising the in situ reaction product of (A) a liquid, two stage condensation resin of (a) resorcinol, (b) about three-tenths to about eight-tenths mole aldehyde per mole of the resorcinol and (c) an aromatic amine having a nuclear amino group containing at least one hydrogen atom which is reactive with said aldehyde, said amine being present in a ratio of about one-tenth to about one and one-tenth times the number of moles of said aldehyde and in a ratio of at least about one-twentieth mole per mole of said resorcinol; (B) sufficient additional reactive aldehyde to provide a total of about one to two and one-half moles of aldehyde per mole of resorcinol in said condensation resin; and in intimate admixture with said A and B rubber latex in a weight ratio of about two to twelve parts latex solids per part of said two-stage condensation resin.

2. Rubber reinforcing element in accordance with claim 1 wherein said organic amine has the formula:

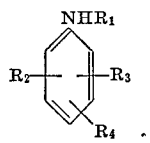

wherein $R_1$ is a member selected from the group consisting of hydrogen, alkylene, aryl and cycloalkyl radicals having from one to about 12 carbon atoms and $R_2$, $R_3$, and $R_4$ are members selected from the group consisting of hydrogen, halogen, nitro, amino, alkoxy, $NHR_1$ and $R_1$ radicals wherein $R_1$ is defined as above.

3. Rubber reinforcing element in accordance with claim 1 wherein said latex is a butadiene polymer latex.

4. Rubber reinforcing element in accordance with claim 3 wherein said butadiene polymer is a copolymer of a butadiene-1,3, styrene and vinyl pyridine.

5. Rubber reinforcing element in accordance with claim 4 wherein said aldehyde is about three tenths to about seven tenths mole of formaldehyde per mole of resorcinol and said organic amine is about three tenths to about seven tenths mole of aniline per mole of resorcinol.

6. Rubber reinforcing element in accordance with claim 1 wherein said element includes a polyisocyanate primer coat under said coating of said reaction product.

References Cited

UNITED STATES PATENTS

| | | | |
|---|---|---|---|
| 2,211,960 | 8/1940 | Meigs | 156—110 A X |
| 2,429,397 | 10/1947 | Compton et al. | 156—110 A X |
| 2,990,313 | 6/1961 | Knowles et al. | 156—110 A X |
| 3,240,650 | 3/1966 | Atwell | 161—241 X |
| 3,419,464 | 12/1968 | Timmons | 117—76 T X |
| 3,522,127 | 7/1970 | Osborne et al. | 156—110 A X |

RALPH HUSACK, Primary Examiner

U.S. Cl. X.R.

117—80, 138.8 F, 161 LN, 163; 156—110 A, 335; 161—241, 248